No. 887,623.                                  PATENTED MAY 12, 1908.
E. GOBBE.
APPARATUS FOR THE MANUFACTURE OF PLATE GLASS.
APPLICATION FILED JUNE 5, 1907.
2 SHEETS—SHEET 1.
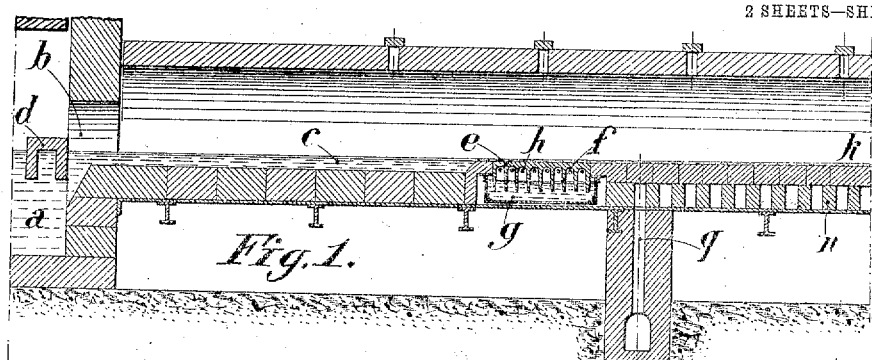
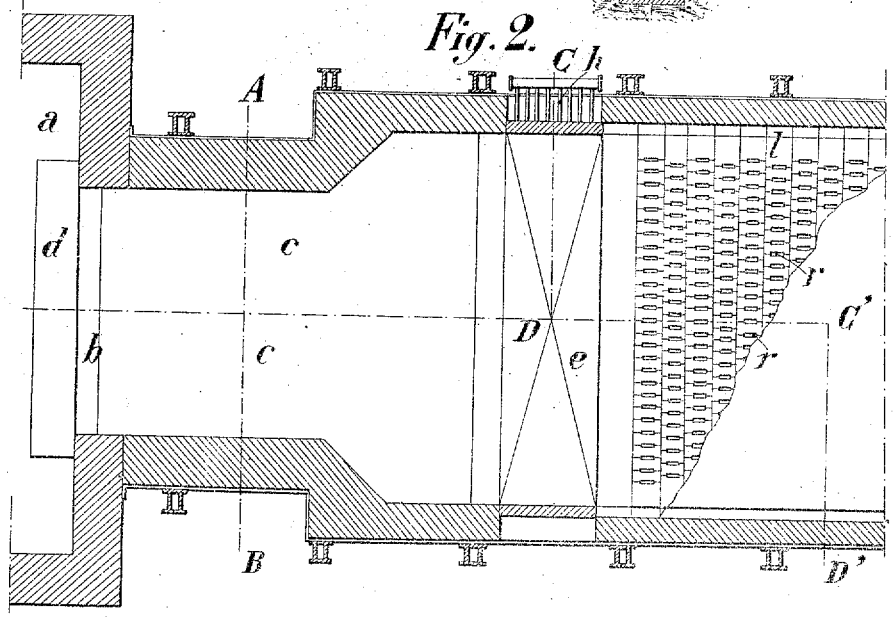
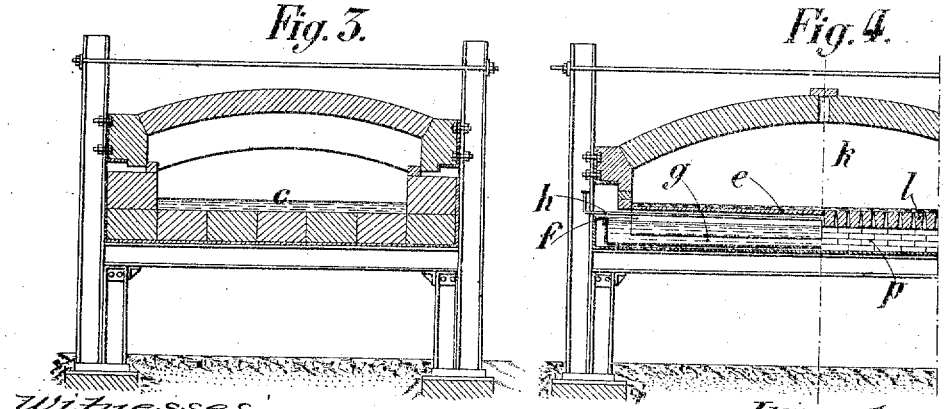
Witnesses:
Inventor
Emile Gobbe
By James L. Norris No. 887,623. PATENTED MAY 12, 1908.
E. GOBBE.
APPARATUS FOR THE MANUFACTURE OF PLATE GLASS.
APPLICATION FILED JUNE 5, 1907.
2 SHEETS—SHEET 2
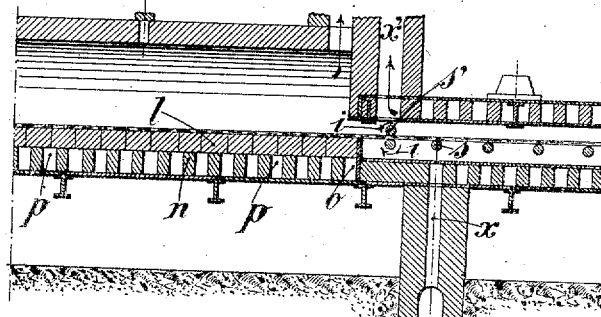
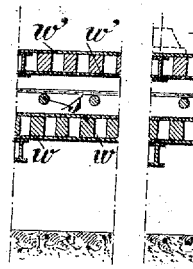
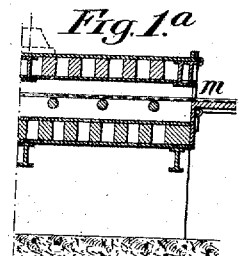
Fig. 1.ª
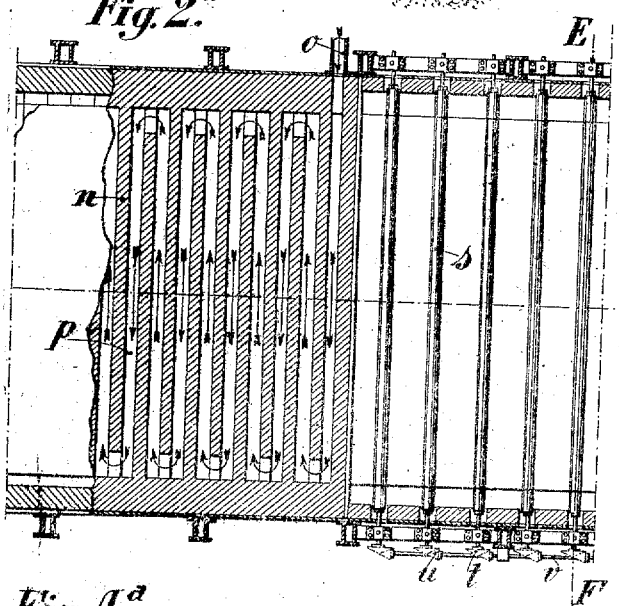
Fig. 2.ª
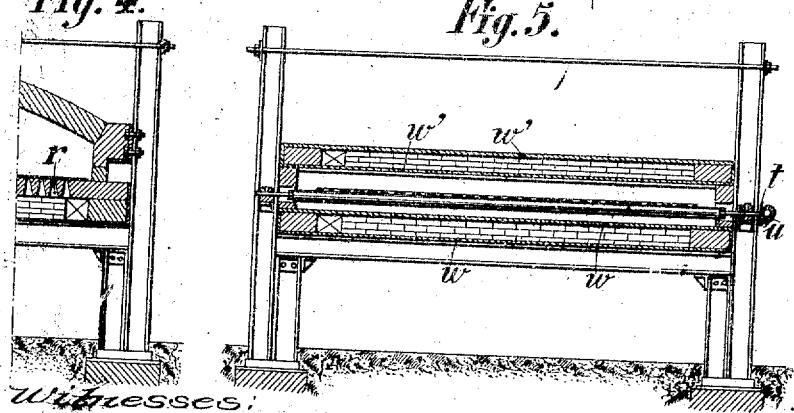
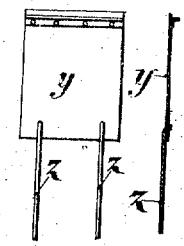
Fig. 4.ª  Fig. 5.  Fig. 6.
Witnesses:
Inventor
Emile Gobbe
By James L. Norris

UNITED STATES PATENT OFFICE.

EMILE GOBBE, OF JUMET, BELGIUM.

APPARATUS FOR THE MANUFACTURE OF PLATE-GLASS.

No. 887,623.

Specification of Letters Patent.

Patented May 12, 1908.

Application filed June 5, 1907. Serial No. 377,362.

*To all whom it may concern:*

Be it known that I, EMILE GOBBE, subject of the King of the Belgians, residing at Jumet, in the Kingdom of Belgium, have invented certain new and useful Improvements in Apparatus for the Manufacture of Plate-Glass, of which the following is a specification.

The invention has for its object to produce a continuous sheet of glass merely by the horizontal flow of the liquid glass issuing from a tank furnace. By its employment it is possible to dispense with glass melting pots or crucibles, the onerous and complicated operation of casting the sheets of glass on cast iron tables, and the annealing of the sheets of glass in intermittent cupeling furnaces, the construction and up-keep of which are costly and which consume a large quantity of fuel.

In the accompanying drawing: Figure 1 represents a longitudinal section through a portion of the apparatus in accordance with the invention. Fig. 1$^a$ represents a continuation of the section shown by Fig. 1. Fig. 2 is a horizontal section through the same. Fig. 2$^a$ is a continuation of the section shown by Fig. 2. Fig. 3 represents a cross-section on the line A—B of Fig. 2. Fig. 4 is a broken cross-section on the line C—D—C'—D' of Fig. 2. Fig. 4$^a$ is a continuation of the section shown by Fig. 4. Fig. 5 represents a cross-section on the line E—F of Fig. 2. Fig. 6 shows detail views of a plate or bait to co-operate with the sheet of glass.

The glass is melted in a tank furnace $a$ of which only the extremity which the glass reaches fined and ready for casting is shown. The tank $a$ communicates by means of a large aperture $b$ with a shallow reservoir $c$ in which the highly liquid glass begins to cool. A floating bridge $d$, placed against the aperture $b$, retains the impurities coming to the surface of the melted glass. The glass having lost a little of its fluidity in the reservoir $c$, reaches a cast iron table $e$ where it spreads uniformly and begins to set.

In order that the glass may not adhere to the table, and so that the latter may be able to withstand the relatively high temperature of the liquid glass, it is necessary to cool it, which is effected by providing it with ribs $f$ entering the water contained in a reservoir $g$; the temperature of the table may be regulated at will merely by varying the level of the water in the reservoir. It is obvious that the ribs $f$ will be cooled to a greater extent in proportion as they are more immersed in the water. In addition to this, there are provided between the ribs and in close proximity to the table, metal conduits $h$ through which water may be caused to circulate if necessary in order to increase the cooling effect.

It is important for the success of the operation that it should be possible to bring the table exactly to such a temperature that the liquid glass is able to flow constantly over it without injuring it and without adhering to the table, and to be able to maintain it at this temperature. It is upon this suitably cooled table that the sheet of glass becomes consistent; the layer of glass as it spreads out rapidly loses its fluidity, ceases to flow, and begins to slide, being thus converted into a sheet of glass which is still slightly malleable, but already sufficiently set to follow the tractional effort which constantly tends to draw it towards the outlet from the gallery $k$ as is hereinafter explained.

In order that the operation may be successfully carried out, it is essential that the temperature of the table $e$ should not become too great, as otherwise the glass would cease to advance because it would neither be able to flow, being too much set, nor slide, seeing that glass adheres very readily to metals when they are sufficiently hot, as is well known to all glass workers. This point constitutes the principal characteristic of the invention in the sense that it permits of producing a continuous flow of a layer of glass from the liquid state to the solid state without shocks and without a break, and this in an exceedingly simple manner; the flowing of the glass being replaced by a sliding of the sheet obtained as soon as the latter begins to set.

In order that the sheet of glass obtained may be of a uniform thickness, and its upper face entirely plane and highly brilliant, it is essential that the sheet should set in a gallery heated to such a temperature that the upper surface of the plate glass in process of formation remains liquid while its lower face solidifies, this being possible owing to the poor conductivity of the glass. During this short period of the lower face of the layer of glass being still sufficiently malleable to extend under the influence of the tractional effort by which it is drawn along, a drawing out of the glass might occur which would reduce the thickness of the sheet of the upper portion if the layer of glass were not sufficiently fluid to flow readily and maintain the horizontality perfect, and consequently insure perfect planimetry of the upper face of the sheet. A little further on, when the lower portion of the sheet becomes entirely solid, it ceases to be drawn out and the sheet may then begin to cool all over and to set on its upper face without any inconvenience. On leaving the table $e$ the sheet of glass slides over an entirely plane refractory sole plate $l$, where it completes its cooling and is at the same time annealed the temperature progressively decreasing from the time the liquid glass reaches the cast iron table until the cold sheet issues at the extremity $m$ of the gallery $k$. This gradual and uniform cooling of the sole plate $l$ is obtained by arranging it on small piers $n$ arranged in such a manner that cold air may be caused to circulate between them in the opposite direction to that of the movement of the sheet; this air enters through the aperture $o$ and being drawn through the chimney $q$ for the discharge of hot air, traverses the conduits $p$ in a winding or zig-zag fashion.

In order to facilitate the continuous sliding of the sheet of glass on the sole plate $l$, the latter may be formed of graphite slabs, or better still, it may be perforated so as to admit of supplying compressed air beneath the sheet of glass on closing the chimney $q$ and on placing the aperture $o$ in communication with a blower.

It will be readily understood that air blown in at a certain pressure will be able to balance the weight of the sheet of glass, and that the tractional effort that it is necessary to exert in order to overcome the friction of the glass upon the sole plate will be very small. On the other hand, the expenditure of air will be insignificant, as it will only be necessary to replace the air which in passing through the apertures $r$ escapes through the small interstices existing between the sheet of glass and the sole plate owing to defects of the planimetry. The sheet of glass thus obtained will reach the tractor rollers $s$ in a solid and already partially annealed condition; these rollers draw it towards the extremity $m$ of the gallery which it leaves cold and so well annealed that it may be cut at once.

The tractor rollers $s$ are operated by means of beveled pinions $t$ and $u$ actuated by a shaft $v$ which is rotated in a continuous and uniform manner by means of some suitable form of motor.

The first roller $s$ is coupled with another roller $s'$ the whole weight of which acts upon the sheet of glass in order to facilitate its displacement.

In order to insure a uniform and methodical cooling of the portion of the gallery which contains the rollers $s$, the sole plate and the roof of this gallery may be made of cast iron plates $w$ and $w'$ having between them intervals in which the cold air circulates zig-zag fashion and in the opposite direction to that of the movement of the sheet; this air is sucked through the chimneys $x$ and $x'$ which it is only necessary to open to a greater or less extent in order to exactly regulate the uniformly decreasing temperature of this portion of the annealing gallery.

In starting the apparatus it is necessary to wait until the level of the glass in the melting tank $a$ reaches the upper level of the casting table $e$. The sheet of glass is then started by means of a metal plate $y$ provided on one side with an angle piece or a flat bar, and connected on the other side with long iron rods $z$ (Fig. 6). This plate is introduced at the extremity $m$ of the gallery on the rollers $s$, which are rotated in the opposite direction to that indicated by the arrow $i$ until the angle piece of the plate $y$ reaches the cast iron table $e$ where it forms a barrier at which the liquid glass will stop. When matters are so arranged the level of the glass in the tank $a$ is raised by rapidly introducing into it a certain quantity of composition or of broken glass; the liquid glass will overflow onto the cast iron table $e$ and will stop at the flange of the plate $y$ to which it will adhere, as the latter is hot. It is then only necessary to rotate the tractor rollers $s$ in the direction indicated by the arrow $i$ in order to bring the plate $y$ towards the outlet from the gallery and draw with it a continuous sheet of glass which will slide upon the table $e$, then upon the sole plate $l$ in passing from the pasty condition to the solid state before coming into contact with the tractor rollers $s$ which will displace it towards the extremity $m$ of the annealing gallery. When the sheet of glass having been started in this manner begins to issue from the gallery, it is detached from the plate $y$ by drawing a diamond along it and a continuous sheet will then constantly issue from the apparatus. It is therefore possible to produce with this apparatus a continuous sheet of glass having a width equal to that of the casting table, and of indefinite length. As regards its thickness, this will remain constant so long as the level of the glass in the tank remains constant. Now this is readily provided for as it is only necessary to introduce the composition in a continuous and uniform manner. In order to modify the thickness of the sheet, it will therefore only be necessary to vary the level of the glass in the melting basin by accelerating or retarding the introduction of the material to be melted, or by causing the speed of rotation of the rollers to vary. The sheet of glass thus obtained will be polished and highly brilliant on its upper side, as on this side it will have retained the natural brilliancy of the fire, not having been tarnished by contact with a solid body. As regards the lower surface of the sheet of glass, it will be less brilliant, owing to its contact with the cast iron table. It is therefore only necessary to polish this face in order to obtain a perfect plate of glass.

Having now particularly described and ascertained the nature of my said invention and in what manner the same is to be performed, I declare that what I claim is:

1. In an apparatus for the continuous production of plate glass, a continuous fusion and constant level tank, a shallow reservoir directly communicating with the tank, a casting table at the inner terminal of the reservoir elevated above the bottom of the latter and having means for bringing it to such temperature that the liquid glass will constantly flow thereover without adherence, the glass being adapted to spread out over the table and rapidly lose its fluidity to cause it to slide, and means for heating the glass after it leaves the casting table.

2. In an apparatus for the continuous production of plate glass, a continuous fusion and constant level tank, a shallow reservoir directly communicating at one extremity with said tank, and a casting table at the inner extremity of the reservoir, said table having its upper surface elevated above the bottom of the reservoir and provided with cooling means to temper glass flowing thereon and cause the glass to slide from the table in sheet form.

3. In an apparatus for the continuous production of plate glass, a receptacle for the melted glass, a shallow reservoir directly communicating at its outer extremity with the receptacle, and a casting table at the inner extremity of the reservoir and elevated above the bottom of said reservoir, the glass flowing over the casting table in a state of malleability.

4. In an apparatus for the continuous production of plate glass, a receptacle for the melted glass, a shallow reservoir directly communicating with the receptacle, the depth of the glass in the shallow reservoir depending upon the height of the glass in the receptacle, a casting table at the inner extremity of the shallow reservoir provided with means for cooling the same and the glass moving thereover, the top of the table being elevated above the bottom of the reservoir and means for drawing the glass in continuous sheet form over the table and outwardly from the apparatus.

5. In an apparatus for the continuous production of plate glass, a receptacle for the molten glass, a shallow reservoir communicating with the receptacle and having the upper surface of the bottom thereof below the upper surface of the glass in the receptacle, and a casting table at the inner terminal of the shallow reservoir over which the glass flows and is formed into a continuous sheet, the upper surface of the table being above the bottom of the reservoir and the said table having means coöperating therewith for preventing the glass from sticking thereto.

6. In an apparatus for the continuous production of plate glass, a continuous fusion and constant level tank, a shallow reservoir directly communicating at its outer extremity with the tank and having the upper surface of its bottom below the level of the upper surface of the molten glass in the tank, and a rigid or fixed casting table at the inner terminal of the shallow reservoir over which the glass flows and is cooled, but preserved in liquid flowing condition.

7. In an apparatus for the continuous production of plate glass, a continuous fusion and constant level tank, a reservoir directly communicating at its outer extremity with said tank, a refractory sole plate, a rigid or fixed casting table interposed between the sole plate and reservoir, and at the inner terminal of the latter and means for drawing the plate of glass over the table and sole plate and outwardly through the apparatus, the top of the casting table being in the same horizontal plane with the sole plate.

8. In an apparatus for the continuous production of plate glass, a continuous fusion and constant level tank, a shallow reservoir directly communicating at its outer extremity with said tank, a rigid or fixed casting table at the inner terminal of the reservoir, a refractory sole plate continuing in the same horizontal plane from the table, and means for drawing the plate glass as formed outwardly through the apparatus.

9. In an apparatus for the continuous production of plate glass, a continuous fusion and constant level tank, a shallow reservoir directly communicating at its outer extremity with the tank, a rigid or fixed casting table located at the inner terminal of the reservoir, a refractory sole plate in continuation of the table, means for cooling the sole plate, and means for engaging and drawing the plate glass as formed on the table and moving it outwardly through the apparatus over the table and plate.

10. In an apparatus for the continuous production of plate glass, a continuous fusion and constant level tank, a shallow reservoir communicating with the tank, a casting table at the inner terminal of the reservoir having its upper surface above the bottom of the latter and provided with cooling means, a refractory sole plate in continuation of the table, means for cooling the sole plate to facilitate sliding of the sheet or plate of glass thereover, and means for drawing the plate of glass as formed outwardly through the apparatus and over the table and sole plate.

11. In an apparatus for the continuous production of plate glass, a casting table, means for supplying molten glass thereto, the table being located at the inner terminal of the means for supplying molten glass and a refractory sole plate in continuation of the table and having means to supply compressed air beneath the sheet of glass moving thereover to reduce the pressure of the latter and the friction thereof upon the sole plate.

12. In an apparatus for the continuous production of plate glass, a casting table, means for supplying fluid glass thereto, the table being located at the inner terminal of the means for supplying molten glass and a refractory perforated sole plate in continuation of the table and having means for supplying compressed air thereto and beneath the sheet of glass to reduce the pressure of the latter and the friction thereof upon the sole plate.

13. In an apparatus for the continuous production of plate glass, a molten glass receptacle, a reservoir communicating with said receptacle, and a rigid or fixed casting table at the inner terminal of the reservoir and having water circulating means thereunder.

14. In an apparatus for the continuous production of plate glass, a receptacle for the molten glass, a reservoir, a casting table in the reservoir having ribs depending from its lower side, and water containing means into which the ribs project.

15. In an apparatus for the continuous production of plate glass, a receptacle for the molten glass, a reservoir communicating with the said receptacle, a casting table in the reservoir having depending ribs, and cooling conduit devices located between the ribs of the casting table.

16. In an apparatus for the continuous production of plate glass, a receptacle for the molten glass, a reservoir communicating with the said receptacle, a rigid or fixed casting table at the inner terminal of the reservoir, a refractory sole plate in continuation of the table, an annealing gallery to which the sole plate leads, and means for engaging the sheet of glass and drawing it outwardly through the annealing gallery and over the table and sole plate.

17. In an apparatus for the continuous production of plate glass, a rigid or fixed casting table, means for supplying molten glass thereto, the table being located at the inner terminal of said means, a refractory sole plate in continuation of the table, an annealing gallery to which the sole plate leads, and tractor devices in the annealing gallery for moving the sheet of glass towards the outer extremity of said gallery.

18. In an apparatus for the continuous production of plate glass, a casting table, means for supplying molten glass thereto, the table being located at the inner terminal of said means, a refractory sole plate in continuation of the table, an annealing gallery, the top and bottom portions of the latter having air circulating means, and devices in the annealing gallery for moving the sheet of glass towards the outer extremity of said gallery.

19. In an apparatus for the continuous production of plate glass, a casting table, means for supplying molten glass thereto, a refractory sole plate in continuation of the table, and an annealing gallery, the top and bottom portions of the latter having air circulating means.

20. In an apparatus for the continuous production of plate glass, a rigid or fixed casting table, means for supplying molten glass thereto, the table being located at the inner terminal of said means, a sole plate in continuation of the table, an annealing gallery to which the sole plate leads, and a device disposed on the table to start movement of the continuous sheet of glass at the commencement of the operation.

21. In an apparatus for the continuous production of plate glass, a continuous fusion and constant level tank for the molten glass, the glass being maintained at a constant level in the tank by the introduction thereof into the glass material to be melted, this material being introduced into the tank at a rate variable in accordance with the desired thickness of the plate to be formed, a reservoir communicating with the tank, and a rigid or fixed casting table at the inner terminal of the reservoir.

22. In an apparatus for the continuous production of plate glass, a continuous fusion and constant level tank or basin for the molten glass, a reservoir communicating with the tank or basin, and a casting table at the inner terminal of the reservoir and having the upper surface thereof at a distance below the upper level of the glass in the tank or basin to determine the thickness of the plate of glass to be formed, the glass flowing from the tank or basin to the table, and the thickness of the glass rendered variable by introducing into the tank or basin the glass material to be melted.

23. In an apparatus for the production of a continuous sheet of glass, a fusion basin, a reservoir communicating with the basin, and a casting table at the inner terminal of the reservoir and having its upper surface above the bottom of the latter, the molten glass in the fusion basin being maintained at a level above the top surface of the table to determine the thickness of the plate of glass, the thickness of the plate of glass being variable in accordance with the introduction of glass material into the molten mass into the basin.

In testimony whereof I have hereunto set my hand in presence of two subscribing witnesses.

EMILE GOBBE.

Witnesses:
G. LEBON,
E. LEEDS.